United States Patent
Singh et al.

(10) Patent No.: US 11,371,711 B2
(45) Date of Patent: Jun. 28, 2022

(54) ROTATING DETONATION COMBUSTOR WITH OFFSET INLET

(71) Applicant: General Electric Company, Schenectady, NY (US)

(72) Inventors: Kapil Kumar Singh, Rexford, NY (US); Narendra Digamber Joshi, Schenectady, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 287 days.

(21) Appl. No.: 16/203,335

(22) Filed: Nov. 28, 2018

(65) Prior Publication Data
US 2020/0166212 A1   May 28, 2020

(51) Int. Cl.
*F23R 7/00* (2006.01)
*F02C 5/02* (2006.01)

(52) U.S. Cl.
CPC .................. *F23R 7/00* (2013.01); *F02C 5/02* (2013.01); *F05D 2240/35* (2013.01)

(58) Field of Classification Search
CPC ....................................................... F23R 7/00
See application file for complete search history.

(56) References Cited

U.S. PATENT DOCUMENTS

| | | | |
|---|---|---|---|
| 3,240,010 A * | 3/1966 | Morrison | F23R 7/00 60/213 |
| 3,584,811 A | 6/1971 | Bramhall et al. | |
| 3,588,298 A * | 6/1971 | Edwards | F23R 7/00 431/1 |
| 3,899,884 A * | 8/1975 | Ekstedt | F23R 3/04 60/737 |
| 3,971,209 A | 7/1976 | de Chair | |
| 5,522,217 A | 6/1996 | Zauner | |
| 6,112,512 A | 9/2000 | Miller et al. | |
| 6,182,437 B1 * | 2/2001 | Prociw | F23D 11/36 60/776 |
| 6,442,930 B1 | 9/2002 | Johnson et al. | |
| 6,526,936 B2 | 3/2003 | Nalim | |
| 6,550,235 B2 | 4/2003 | Johnson et al. | |
| 6,883,302 B2 | 4/2005 | Koshoffer | |
| 6,926,231 B2 | 8/2005 | Ouellette et al. | |

(Continued)

OTHER PUBLICATIONS

Rankin et al "Overview of Performance, Application, and Analysis of Rotating Detonation Engine Technologies", Journal of Propulsion and Power vol. 33, No. 1, Jan.-Feb. 2017, pp. 131-143. (Year: 2017).*

(Continued)

*Primary Examiner* — Ted Kim
(74) *Attorney, Agent, or Firm* — Venable LLP; Edward A. Kmett; Michele V. Frank

(57) ABSTRACT

A combustion system includes an annular tube disposed between an inner wall and an outer wall, the annular tube extending from an inlet end to an outlet end; at least one annulus inlet disposed in the annular tube proximate the inlet end, the annulus inlet providing a conduit through which fluid flows into the annular tube; at least one outlet disposed in the annular tube proximate the outlet end; at least one inlet fluid plenum disposed upstream of the annulus inlet; and at least one fluid inlet disposed upstream of the inlet fluid plenum. The fluid inlet is linearly offset from the annulus inlet.

12 Claims, 3 Drawing Sheets

(56) References Cited

U.S. PATENT DOCUMENTS

| | | | |
|---|---|---|---|
| 7,198,234 B2 | 4/2007 | Saddoughi | |
| 8,683,780 B2 | 4/2014 | Shimo et al. | |
| 8,887,482 B1 | 11/2014 | Ruggeri et al. | |
| 8,931,518 B2 | 1/2015 | Whalen | |
| 9,347,376 B2* | 5/2016 | Popovic | F02C 7/224 |
| 9,816,463 B2 | 11/2017 | Falempin et al. | |
| 2006/0112672 A1* | 6/2006 | Razzell | F02C 5/11 |
| | | | 60/39.77 |
| 2009/0193786 A1* | 8/2009 | Murrow | F02C 3/16 |
| | | | 60/39.78 |
| 2017/0146244 A1* | 5/2017 | Kurosaka | F23R 7/00 |
| 2018/0010800 A1 | 1/2018 | Nagesh | |
| 2018/0179953 A1 | 6/2018 | Tangirala et al. | |
| 2018/0180289 A1 | 6/2018 | Lavertu, Jr. et al. | |
| 2018/0231256 A1 | 8/2018 | Pal et al. | |
| 2018/0274439 A1* | 9/2018 | Holley | F02K 7/00 |
| 2018/0274787 A1* | 9/2018 | Greene | F02C 5/02 |

OTHER PUBLICATIONS

Zhou et al "Progress of continuously rotating detonation engines" Chinese Journal of Aeronautics (2016) 29(1); pp. 15-29 (Year: 2016).*

Lin et al "Experimental study on propagation mode of H2/Air continuously rotating detonation wave" international journal of hydrogen energy 40 (2015), pp. 1980-1993 (Year: 2015).*

* cited by examiner

ROTATING DETONATION COMBUSTOR WITH OFFSET INLET

BACKGROUND

The present subject matter relates generally to a combustor of an engine, such as a rotating detonation engine.

A rotating detonation engine includes an annulus with an inlet end through which a fuel and air mixture enters and an outlet end from which exhaust exits. A detonation wave travels in a circumferential direction of the annulus and consumes the incoming fuel and air mixture. The burned fuel and air mixture (e.g., combustion gases) exits the annulus and is exhausted with the exhaust flow.

The detonation wave provides a high-pressure region in an expansion region of the combustion system. Rotating detonation pressure gain combustion systems are expected to operate at much higher frequencies than other pressure gain combustion concepts such as pulse detonation combustors.

Maintaining a rotating detonation wave within rotating detonation combustors during low power conditions of the engines, as well as selectively controlling and/or adjusting the operating conditions present technical challenges. For example, when a rotating detonation engine is operating at an idle condition (e.g., not generating enough propulsive force to propel the engine or a vehicle that includes the engine), the detonations rotating within the combustor of the engine may dissipate or be extinguished.

BRIEF DESCRIPTION OF THE EMBODIMENTS

Aspects of the present embodiments are summarized below. These embodiments are not intended to limit the scope of the present claimed embodiments, but rather, these embodiments are intended only to provide a brief summary of possible forms of the embodiments. Furthermore, the embodiments may encompass a variety of forms that may be similar to or different from the embodiments set forth below, commensurate with the scope of the claims.

In one aspect, a combustion system includes an annular tube disposed between an inner wall and an outer wall, the annular tube extending from an inlet end to an outlet end; at least one annulus inlet disposed in the annular tube proximate the inlet end, the annulus inlet providing a conduit through which fluid flows into the annular tube; at least one outlet disposed in the annular tube proximate the outlet end; at least one inlet fluid plenum disposed upstream of the annulus inlet; and at least one fluid inlet disposed upstream of the inlet fluid plenum. The fluid inlet is linearly offset from the annulus inlet.

In another aspect, a combustion system includes an annular tube disposed between an inner wall and an outer wall, the annular tube extending from an inlet end to an outlet end; at least one annulus inlet disposed in the annular tube proximate the inlet end, the annulus inlet providing a conduit through which fluid flows into the annular tube; at least one outlet disposed in the annular tube proximate the outlet end; and at least one annulus forward wall extending radially outward from a downstream end of the annulus inlet, the annulus forward wall comprising a backward facing step. The backward facing step reflects pressure waves resulting from rotating detonation toward the outlet end.

In another aspect, a combustion system includes an annular tube disposed between an inner wall and an outer wall, the annular tube extending from an inlet end to an outlet end; at least one annulus inlet disposed in the annular tube proximate the inlet end, the annulus inlet providing a conduit through which fluid flows into the annular tube; at least one outlet disposed in the annular tube proximate the outlet end; and, at least one fluid inlet fluidly coupled upstream of the annulus inlet. A centerline of the fluid inlet is colinear with a centerline of the at least one annulus inlet.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Figure 1:
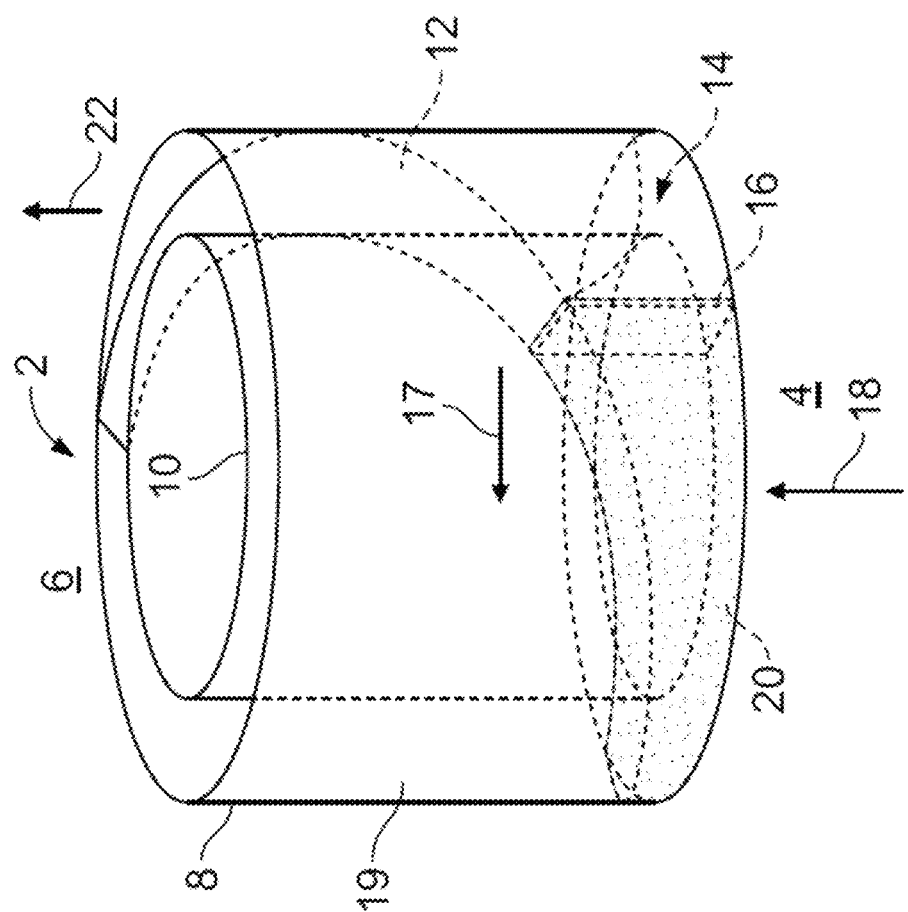
FIG. 1 is a perspective schematic representation of a rotating detonation combustor.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the term "axial" refers to a direction aligned with a central axis or shaft of a gas turbine engine or alternatively the central axis of a propulsion engine, a combustor, and/or internal combustion engine. An axially forward end of the gas turbine engine or combustor is the end proximate the fan, compressor inlet, and/or air inlet where air enters the gas turbine engine and/or the combustor. An axially aft end of the gas turbine engine or combustor is the end of the gas turbine or combustor proximate to the engine or combustor exhaust where combustion gases exit the engine or combustor. In non-turbine engines, axially aft is toward the exhaust and axially forward is toward the inlet.

As used herein, the term "circumferential" refers to a direction or directions around (and tangential to) the circumference of an annulus of a combustor, or for example the circle defined by the swept area of the turbine blades. As used herein, the terms "circumferential" and "tangential" are synonymous.

As used herein, the term "radial" refers to a direction moving outwardly away from the central axis of the gas turbine, or alternatively the central axis of a propulsion engine. A "radially inward" direction is aligned toward the central axis moving toward decreasing radii. A "radially outward" direction is aligned away from the central axis moving toward increasing radii.

FIG. 1 illustrates a schematic diagram of one example of a rotating detonation combustor 2. The combustor 2 includes an annular combustor formed from an outer wall 8 and an inner wall 10. The combustor that is defined by the walls 8, 10 has an inlet end 4 (in which a fuel/air mixture 18 enters) and an outlet end 6 from which an exhaust flow 22 exits the combustor 2. A detonation wave 16 travels in a circumferential direction 17 of the annulus (and around an annular axis of the annulus), thereby consuming the incoming fuel/air mixture 18 and providing a high-pressure region 14 in an expansion region 12 of the combustor 2. The burned fuel/air mixture (e.g., combustion gases) 19 exit the annulus and are exhausted as the exhaust flow 22. The region 20 behind the detonation wave 16 has very high pressures and this pressure can feed back into an upstream chamber from which the air and fuel are introduced and form an unburnt fuel/air mixture 18. Thermally managing the temperatures and thermal gradients within and around the combustor 2 may enhance the durability, operability, and/or overall performance of the combustor 2.

Figure 2:
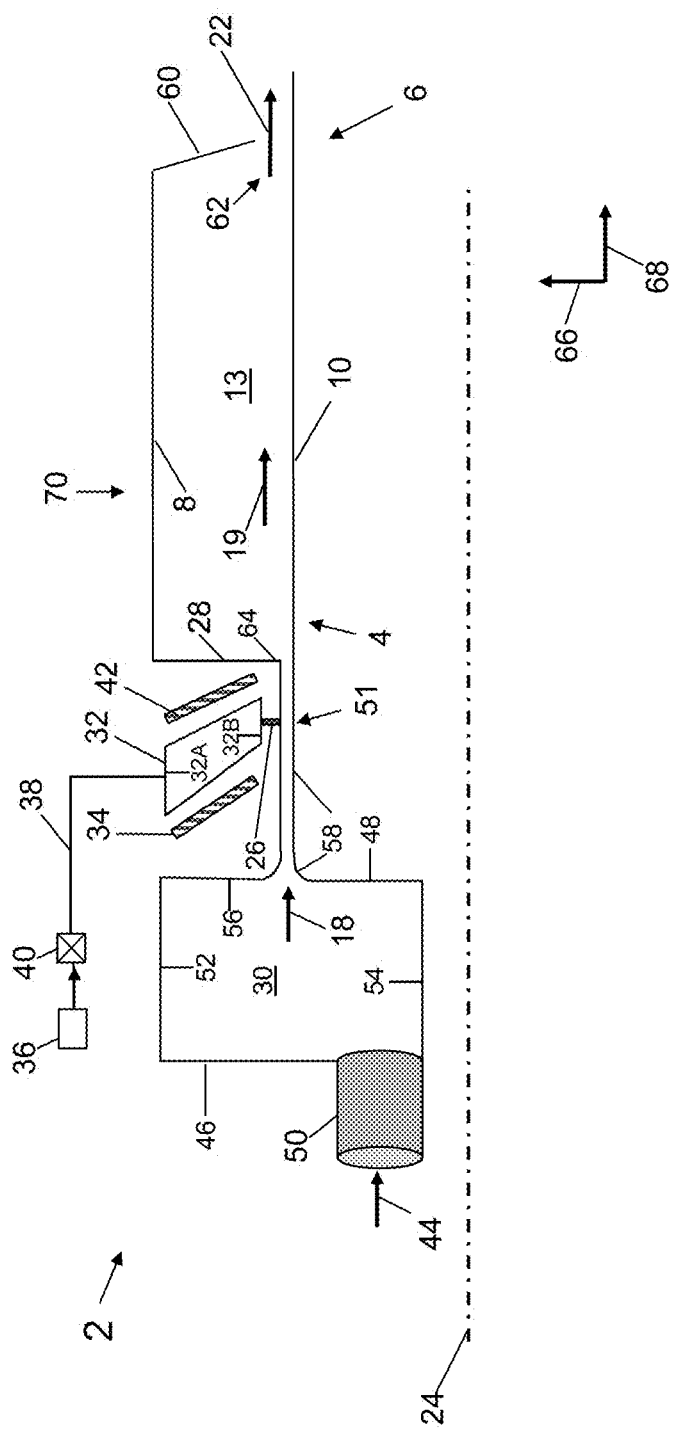
FIG. 2 is a side schematic representation of a rotating detonation combustor.

FIG. 2 illustrates a side view of a rotating detonation combustor 2 according to the embodiments disclosed herein. The combustor 2 includes a combustion tube (or annular tube) 70 extending between an inlet end 4 and an outlet end 6. The inlet end 4 includes an annulus forward wall 28 defining an axially forward wall of the annular tube 70, while the outlet end 6 includes a combustor aft wall 60. At a radially inward corner, the annulus forward wall 28 includes a backward facing step 64. An annulus 13 is defined between the inner wall 10, the outer wall 8, the annulus forward wall 28, and the combustor aft wall 60. The annulus 13 is an annular ring, axisymmetric about a combustor centerline 24. A side view of the annulus 13 is depicted in FIG. 2, however, the annulus 13 extends circumferentially 360 degrees about the combustor centerline 24. The combustor centerline 24 may be colinear and/or overlapping with an engine centerline. An incoming fluid 18 (i.e., air, oxidizer, and/or fuel/air mixture) enters the annulus 13 at an annulus inlet 58 disposed upstream of a throat area 51 proximate the inlet end 4. The annulus inlet 58 and throat area 51 collectively act as a fluid inlet or air inlet to the combustor annular tube 70. At least one igniter (not shown) may be disposed in the inner wall 10, the outer wall 8, and/or the annulus forward wall 28 at the inlet end 4 of the combustor 2, for igniting the fuel/air mixture 18. A combustor exhaust 62 is disposed at an axially downstream end of the annulus 13 proximate the outlet end 6. Combustion gas 19 travels in an axially aft and circumferential direction toward the outlet end 6, where exhaust gas 22 is dispersed through the combustor exhaust 62.

FIG. 2 illustrates an axial direction 68 and a radial direction 66. The axial direction 68 illustrated in FIG. 2 is oriented in an axially aft direction, while the radial direction 66 is oriented in a radially outward direction. An axially forward direction (not shown) is the opposite direction of the axial direction 68 (or axially aft direction) illustrated in FIG. 2. Similarly, a radially inward direction (not shown) is the opposite direction of the radial direction 66 (or radially outward direction) illustrated in FIG. 2. A circumferential or tangential direction is into or out of the plane of the figure (i.e., "into the page") and is orthogonal to both the radial and axial directions. An air inlet plenum 30 is coupled fluidly upstream of both the throat area 51, and the annulus inlet 58 for delivering air, oxidizer, fluids, and/or fuel-air mixtures to the annulus 13. The air inlet plenum 30 may also be described as a fluid inlet plenum 30 because according to the embodiments described herein, fluids other than air may flow through the fluid/air inlet plenum 30. The air inlet plenum 30 receives a working fluid (air, an oxidizer, and/or fuel-air mixtures) from an axial inlet 50 disposed axially forward of the air inlet plenum 30. The air and/or oxidizer may be pressurized prior to entering the axial inlet 50 via a compressor (not shown), ram effects, and/or via other means.

The air inlet plenum 30 is defined between a plenum outer wall 52, a plenum inner wall 54, a plenum forward wall 46, an outer aft wall 56 and an inner aft wall 48. The outer aft wall 56 and the inner aft wall 48 are coupled to radially outer and radially inner portions of the annulus inlet 58. The transitions between each of the outer and inner aft walls 56, 48 and the radially outer and inner portions of the annulus inlet 58 may be contoured, as illustrated in FIG. 2. The air inlet 50 may be offset from the annulus inlet 58 such that inlet air 44 is redirected radially outward after passing through the air inlet 50 before flowing through the annulus inlet 58. Stated otherwise, a centerline of the air inlet 50 may be linearly offset from a centerline of the annulus inlet 58.

In operation, pressure waves propagate within the annulus area 13 as a result of rotating detonation, and travel primarily circumferentially but also axially aft toward the aft wall 60. However, portions of pressure waves propagating within the annulus area 13 may also travel back through the throat area 51 and annulus inlet 58 toward the plenum forward wall 46. The portions of the pressure waves that travel back through the throat area 51 and annulus inlet 58 may be reflected off the plenum forward wall 46 (which may be substantially radially aligned and orthogonal to an axial direction) and redirected back toward the annulus inlet 58. Due to the geometry of the air inlet plenum 30, pressure waves that expand therein may reflect off the plenum forward wall 46 back toward the throat area 51 (through which they travel back toward the aft wall 60). In addition, as a result of the air inlet 50 being offset from the annulus inlet 58, pressure waves that travel back through the throat area 51 and annulus inlet 58 help to minimize losses within the combustor 2 associated with propagating pressure and/or detonation waves, because they are not traveling back through the air inlet. Stated otherwise, the pressure waves that travel back through the throat area 51 and annulus inlet 58 are remaining within the inlet plenum 30 rather than exiting the combustor 2 via the air inlet 50, thereby allowing the combustor 2 to retain and utilize a greater portion of the energy that is released during rotating detonation operation.

The annulus forward wall 28 spans a large portion of the radial height of the annulus 13, allowing the annulus forward wall 28 and backward facing step 64 to reflect pressure waves back toward the annulus aft wall 60. As such, the annulus forward wall 28 and backward facing step 64 together may reflect a large portion of pressure waves, while the plenum forward wall 46 may serve to reflect a large portion of the pressure waves that make their way through the throat area 51 past the annulus forward wall 28 and backward facing step 64. In some embodiments, the annulus forward wall 28 may span about 50% or more of the radial height (i.e., distance between the outer wall 8 and the inner wall 10) of the annulus 13 (or annular tube 70). In other embodiments, the annulus forward wall 28 may span about 60% or more of the radial height of the annulus 13. In other embodiments, the annulus forward wall 28 may span about 70% or more of the radial height of the annulus 13. In other embodiments, the annulus forward wall 28 may span about 80% or more of the radial height of the annulus 13. In other embodiments, the annulus forward wall 28 may span about 90% or more of the radial height of the annulus 13.

Still referring to FIG. 2, one or more primary fuel injectors 26 may be disposed in the annulus inlet 58 proximate the throat area 51, the one or more primary fuel injectors being in a radially inward pointing orientation. The one or more primary fuel injectors 26 may include a fuel nozzle (not shown) that may be aligned substantially radially inward to disperse fuel within the annulus inlet 58 into oncoming inlet fluid 18 (i.e., inlet air and/or inlet oxidizer). The primary fuel injector 26 disperses fuel via the fuel nozzle into the inlet air 18 (or oxidizer) as inlet air enters the combustor tube 70 at the throat area 51. The primary fuel injector 26 may disperse fuel orthogonal to the direction of the inlet air 18, which may flow into the annulus in an axial direction 68. A fuel plenum 32 may be fluidly coupled upstream of the primary fuel injector 26. The fuel plenum 32 may have a 4-sided cross section as illustrated in FIG. 2, and may also include other suitable cross-sectional shapes such as circular, oval, elliptical, polygonal, pentagonal, rectangular, square, triangular, hexagonal, as well as other shapes. The fuel plenum 32 may be substantially trapezoidal and may have parallel radially inner and radially outer walls 32B, 32A, each of which is aligned substantially axially. A first fuel line 38 is fluidly coupled upstream of the fuel plenum 32 for delivering fuel to the fuel plenum 32. A first fuel control valve 40 is fluidly coupled upstream of the first fuel line 38. A fuel supply 36 is fluidly coupled upstream of the first fuel control valve 40. Each of the annular tube 70 (including the inner and outer walls 10, 8, annulus inlet 58, and the throat area 51), the fuel plenum 32, the air inlet plenum 30, and the axial inlet 50 may circumferentially surround the combustor centerline 24 such that each is axisymmetric about the combustor centerline 24. One or more secondary, tertiary, and/or auxiliary fuel injectors (not shown) may also be disposed within various walls and/or structures of the combustor 2. Each of the inner and outer walls 10, 8 as well as the air inlet plenum walls 46, 52, 56, 64, 48, the annulus inlet 58, and the annulus forward wall 64 may include cooling features disposed therein.

Referring still to FIG. 2, a first cavity 34 may be disposed axially forward of the fuel plenum 32 and a second cavity 42 may be disposed axially aft of the fuel plenum 32. Each of the first and second cavities 34, 42 may extend circumferentially around the engine centerline and may be angled to match the respective angling of the axially forward and axially aft walls of the fuel plenum 32. Each of the first and second cavities 34, 42 may have a cross section with a length that is between about 4 and about 20 times greater than a width. In other embodiments, each of the first and second cavities 34, 42 may have a cross section with a length that is between about 6 and about 16 times greater than the width. In other embodiments, each of the first and second cavities 34, 42 may have a cross section with a length that is between about 8 and about 14 times greater than the width. In other embodiments, each of the first and second cavities 34, 42 may have a cross section with a length that is between about 10 and about 12 times greater than the width. Each of the first and second cavities 34, 42 may be fluidly coupled to the fuel plenum 32 and may act as anti-coking features, preventing and/or reducing the build-up of coke within the fuel plenum 32. The stagnant fuel in each of the first and second cavities 34, 42 cokes up and becomes a thermal barrier to the fuel in fuel plenum 32, and as such act as an anti-coking features.

Referring still to FIG. 2, the combustor aft wall 60 may be oriented in a radial direction and/or may be oriented to have components in both the radial and axial directions, as illustrated in FIG. 2. For example, the combustor aft wall 60 may be oriented from about 0 to about 30 degrees from a radial direction. In other embodiments, the combustor aft wall 60 may be oriented from about 5 to about 25 degrees from a radial direction. In other embodiments, the combustor aft wall 60 may be oriented from about 10 to about 20 degrees from a radial direction. In other embodiments, the combustor aft wall 60 may be oriented from about 12 to about 18 degrees from a radial direction. The combustor aft wall 60, in concert with the aft end of the inner wall 10, forms the combustor exhaust 62, through which the exhaust flow 22 flows. The combustor exhaust 62 is disposed in a radial gap between the radially inner end of the combustor aft wall 60 and the axially aft end of the inner wall 10. The radial gap extends 360 degrees around the annular combustor 2, axisymmetric or substantially axisymmetric about the combustor centerline 24. The radial gap that defines the combustor exhaust 62 may span a greater linear distance than the radial gap that the defines the throat area 51. Similarly, the flow area of the combustor exhaust 62 may be greater than the flow area of the throat area 51.

The primary fuel injector 26, as well as any other fuel injectors, may disperse fuel through holes and/or orifices that are circular, elliptical, slotted, and/or other suitable shapes. A minimum dimension (i.e., diameter, width, minor axis, etc.) of the holes and/or orifices in each of the primary fuel injector 26 and/or other fuel injectors may be from about 3 to about 30 mils (i.e., thousandths of an inch). In other embodiments, the minimum dimension of the holes and/or orifices may be from about 5 to about 20 mils. In other embodiments, the minimum dimension of the holes and/or orifices may be from about 8 to about 17 mils. In other embodiments, the minimum dimension of the holes and/or orifices may be from about 10 to about 15 mils.

Figure 3:
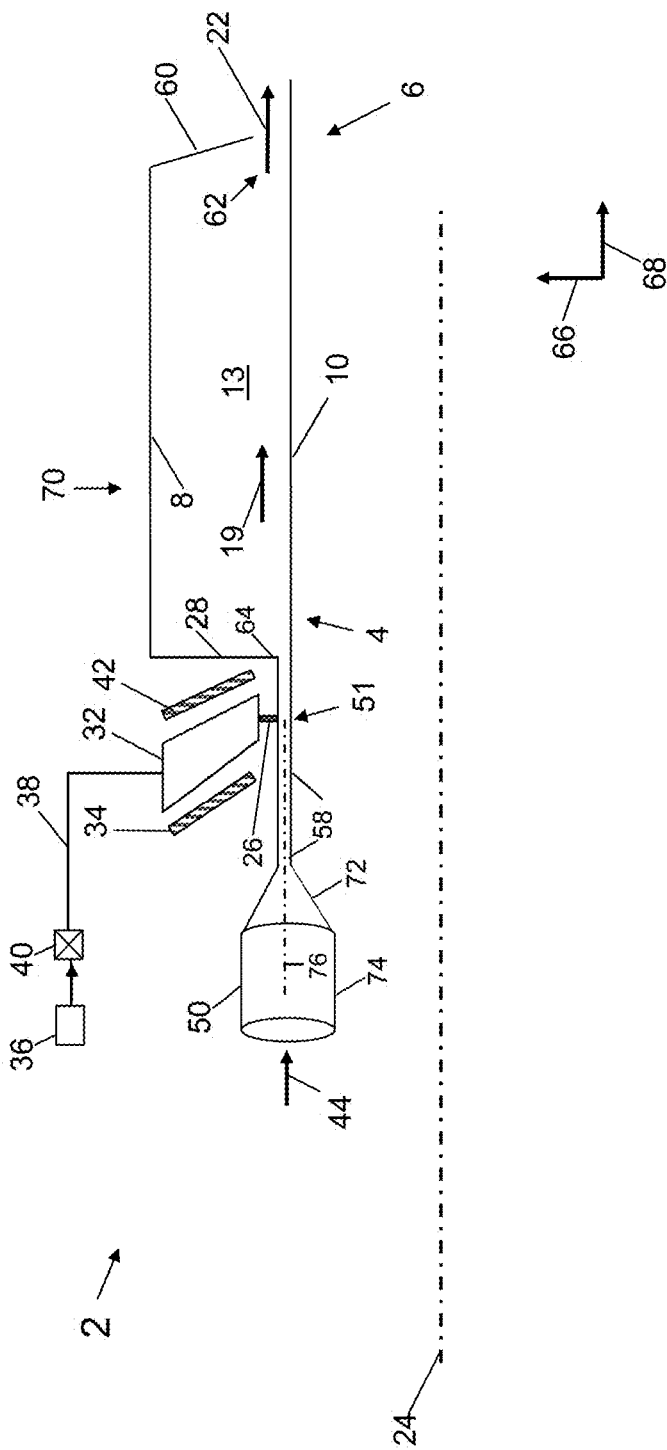
FIG. 3 is a side schematic representation of a rotating detonation combustor; according to aspects of the present embodiments.

FIG. 3 illustrates a side view of a rotating detonation combustor 2 including an axial inlet 50 that feeds air directly into the annulus inlet 58. In the embodiment of FIG. 3, an air inlet plenum is not present, and the axial inlet 50 is not offset from the annulus inlet 58. In the embodiment of FIG. 3, a central axis 76 of the air inlet 50 may be colinear and/or aligned with a central axis of the annulus inlet 58 and throat area 51. In addition, the air inlet 50 may include a cylindrical portion 74 upstream of a conical portion 72. The conical portion 72 may form the transition between the cylindrical portion 74 and the annulus inlet 58 and may serve to decrease the flow area relative to an axially downstream flow direction (i.e., relative to the direction of flow of inlet air 44). Stated otherwise, a first flow area within the cylindrical portion 74 is greater than a second flow area within the annulus inlet 58. In the embodiment of FIG. 3, although the air inlet 50 is not offset from the annulus inlet 58, the annulus forward wall 28 and backward facing step 64 may serve to greatly reduce the occurrence and/or magnitude of pressure waves traveling from the annulus 13 back through the throat area 51 toward the air inlet 50, thereby enhancing the performance of the combustor 2.

A rotating detonation wave resulting from combustion of a fuel-air mixture from the one or more primary fuel injectors 26 and/or inlet air 18 may travel circumferentially around the combustor 2 as it travels the axial length of the combustor tube (or annular tube) 70, from the inlet end 4 to the outlet end 6. The magnitude of the rotating detonation wave may begin to dissipate as it propagates circumferentially and axially (forward and aft) through the combustor 2. Reflecting pressure and/or detonation waves that travel toward the axial inlet 50 back through the throat area 51 toward the aft end 6 may enhance the performance of the rotating detonation combustor 2, while in operation. As such, the geometry of the air inlet plenum 30 (FIG. 2), the offset air inlet 50 (FIG. 2), and both the annulus forward wall 28 and backward facing step 64 (FIGS. 2 and 3) may allow the combustor 2 to remain in stable operation while simultaneously augmenting the performance of the combustor 2.

In operation, each of the embodiments disclosed herein may include multiple detonation waves simultaneously propagating in a circumferential (and axially aft) direction such that they wrap around the annulus 13 as they move from an inlet end 4 to an outlet end 6. Chemistry and combustor dynamics, as well as other factors, may limit the minimum size of both the combustor 2 as well as the area and/or volume of the annulus 13 due to a minimum amount of time required for the rotating denotation wave to travel around the annulus. As such, the area of the annulus 13, the overall radius of the combustor 2, and/or the overall axial length of the combustor 2 may all be adjusted to ensure the chemistry considerations as well as other factors such as combustor dynamics, aerodynamics, thermal management, and other considerations are all balanced accordingly. In addition, it may be desirable for the combustor 2 to have a non-circular shape in order to increase the distance around the annulus 13 that the rotating detonation wave may travel, while simultaneously allowing the axial length of the combustor 2 to be decreased.

As used herein, "detonation" and "quasi-detonation" may be used interchangeably. Typical embodiments of detonation chambers include a means of igniting a fuel/oxidizer mixture, for example a fuel/air mixture, and a confining chamber, in which pressure wave fronts initiated by the ignition process coalesce to produce a detonation wave. Each detonation or quasi-detonation is initiated either by external ignition, such as spark discharge or laser pulse, or by gas dynamic processes, such as shock focusing, autoignition or by another detonation via cross-firing. The geometry of the detonation chamber is such that the pressure rise of the detonation wave expels combustion products out of the detonation chamber exhaust to produce a thrust force, as well as for other purposes such as flow control actuation. In addition, rotating detonation combustors are designed such that a substantially continuous detonation wave is produced and discharged therefrom. Detonation may be accomplished in a number of types of detonation chambers, including detonation tubes, shock tubes, resonating detonation cavities, and annular detonation chambers.

Each of the embodiments disclosed herein include fuel being combusted in the presence of an oxidizer. Fuel mixes with an oxidizer during or prior to the combustion process. The embodiments disclosed herein include air as one possible oxidizer. However, other oxidizers such as straight oxygen (i.e., pure oxygen) are also possible. In various conditions, oxygen may be a preferred oxidizer over air. In other conditions, air may be the preferred oxidizer. As used herein, the terms "oxygen" and "pure oxygen," may include gas that is at least about 80% oxygen by mass. In some embodiments, the oxidizer may be at least about 90% oxygen by mass. In other embodiments, the oxidizer may be about 93% to about 99.3% oxygen by mass. In other embodiments, the oxidizer may be greater than about 99.3% oxygen by mass. (By comparison, air is about 21% oxygen, about 78% nitrogen and about 1% other gases). Other oxidizers other than oxygen and air are also possible. In embodiments that use an oxidizer other than air, those embodiments will include the corresponding system components including, for example, an oxidizer inlet, an oxidizer supply line, an oxidizer supply, an oxidizer flow control mechanism, an oxidizer flow modulator, and/or a second oxidizer inlet.

Each of the embodiments disclosed herein include a source of ignition, which may be in the form of a spark igniter and/or via autoignition (i.e., via heated inner and outer walls 10, 8, and/or heated annulus forward and aft walls 28, 60 which have absorbed heat from the combustion process), as well as via volumetric ignition. Some embodiments may include multiple sources of ignition. For example, in some embodiments, at least one spark igniter may be used during some operating conditions and then ignition may transition to autoignition and/or volumetric ignition at other operating conditions.

The present embodiments include an aircraft, an engine, a combustor, and/or systems thereof which include rotating detonation combustion. The embodiments presented herein operate on a kilohertz range (1000 Hz to 1000 kHz), which is faster than the 100 Hz operating frequency of previous pulse detonation actuators (PDA) and/or pulse detonation engines (PDE). As such, the embodiments presented herein may provide a more continuous and less pulsed combustion gas jet discharging from the combustor exhaust 62 compared to previous pulse detonation actuators (PDA).

The present embodiments offer both high operating frequency and significant control authority, which provides benefits in numerous practical applications, such as engine exhaust thrust vectoring for vehicle control or boundary layer separation control for aircraft lift enhancement and drag reduction. The present embodiments may also be used as enhancements or combustion systems for supersonic and/or hypersonic applications, for example, in scramjet engines, as well as in subsonic gas turbine applications. The present embodiments take advantage of a more compact and/or power dense combustion system. The present embodiments may be used as the primary combustion system for engines such as gas turbine engines. The present embodiments may be used as the secondary, tertiary, and/or auxiliary combustion systems for engines such as gas turbine engines, and/or other components of an aircraft or of other applications.

Exemplary applications of the present embodiments may include high-speed aircraft, separation control on airfoils, flame holders, flame stability, augmenters, propulsion, flight stability, flight control, as well as other uses.

Although specific features of various embodiments of the present disclosure may be shown in some drawings and not in others, this is for convenience only. In accordance with the principles of the present disclosure, any feature of a drawing may be referenced and/or claimed in combination with any feature of any other drawing.

This written description uses examples to disclose the embodiments of the present disclosure, including the best mode, and also to enable any person skilled in the art to practice the disclosure, including making and using any devices or systems and performing any incorporated methods. The patentable scope of the embodiments described herein is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A rotating detonation combustion system, the rotating detonation combustion system defining a longitudinal direction and a radial direction orthogonal to the longitudinal direction, the rotating detonation combustion system comprising:
   an annular tube disposed between an inner wall and an outer wall, the annular tube extending in the longitudinal direction from an inlet end of the annular tube to an outlet end of the annular tube;
   an annulus inlet disposed in the annular tube proximate at a radially inward portion of the inlet end, the annulus inlet extending in the longitudinal direction and providing a conduit through which fluid flows into the annular tube;
   an outlet disposed in the annular tube proximate the outlet end;
   an inlet fluid plenum disposed upstream of the annulus inlet and fluidly connected to an inlet end of the annulus inlet, the fluid plenum extending radially outward from, and radially inward from the inlet end of the annulus inlet;
   a fluid inlet disposed upstream of the inlet fluid plenum, the fluid inlet being radially offset inward of the inlet end of the annulus inlet such that the fluid inlet and the inlet end of the annulus inlet do not overlap in the radial direction; and
   a fuel injector disposed in the annulus inlet between the inlet fluid plenum and the inlet end of the annular tube, wherein the fuel injector extends in the radial direction with respect to the annulus inlet and injects fuel into the annulus inlet.

2. The rotating detonation combustion system of claim 1, wherein the annular tube is configured to direct at least one rotating detonation wave propagating through the annular tube.

3. The rotating detonation combustion system of claim 1, further comprising:
   an annulus forward wall extending radially outward from a downstream end of the annulus inlet, the annulus forward wall comprising a backward facing step.

4. The rotating detonation combustion system of claim 3, wherein the annulus forward wall comprises a radial height that is at least about 50% of a radial height of the annular tube.

5. The rotating detonation combustion system of claim 1, the inlet fluid plenum further comprising:
   a plenum forward wall extending radially outward from the fluid inlet;
   a plenum inner wall defining a radially inner boundary of the fluid plenum;
   a plenum outer wall defining a radially outer boundary of the inlet fluid plenum;
   an outer plenum aft wall; and
   an inner plenum aft wall,
   wherein the outer plenum aft wall and the inner plenum aft wall are coupled to radially outer and inner portions of the annulus inlet.

6. The rotating detonation combustion system of claim 1, further comprising a fuel plenum fluidly coupled upstream of the fuel injector.

7. The rotating detonation combustion system of claim 6, further comprising at least one cavity disposed at least one of axially forward or axially aft of the plenum, wherein the at least one cavity is fluidly coupled to the fuel plenum.

8. The rotating detonation combustion system of claim 7, wherein a length of the at least one cavity is at least about 4 times a width of the at least one cavity.

9. The rotating detonation combustion system of claim 6, wherein the fuel plenum comprises a cross section that is substantially trapezoidal.

10. The rotating detonation combustion system of claim 9, wherein the fuel plenum comprises a radial inner wall and a radial outer wall,
    wherein an axial length of radial inner wall is shorter than an axial length of the radial outer wall, the axial length defined by a direction extending from annular tube inlet end to annular tube outlet end.

11. The rotating detonation combustion system of claim 10, wherein the fuel plenum is arranged at an acute angle extending radially outward with respect to the annulus forward wall.

12. The rotating detonation combustion system of claim 1, the annulus inlet further comprising a throat area, wherein the fuel injector is disposed in the throat area.

* * * * *